(Model.)
J. SMITH.
PATTY PAN.
No. 255,045. Patented Mar. 14, 1882.
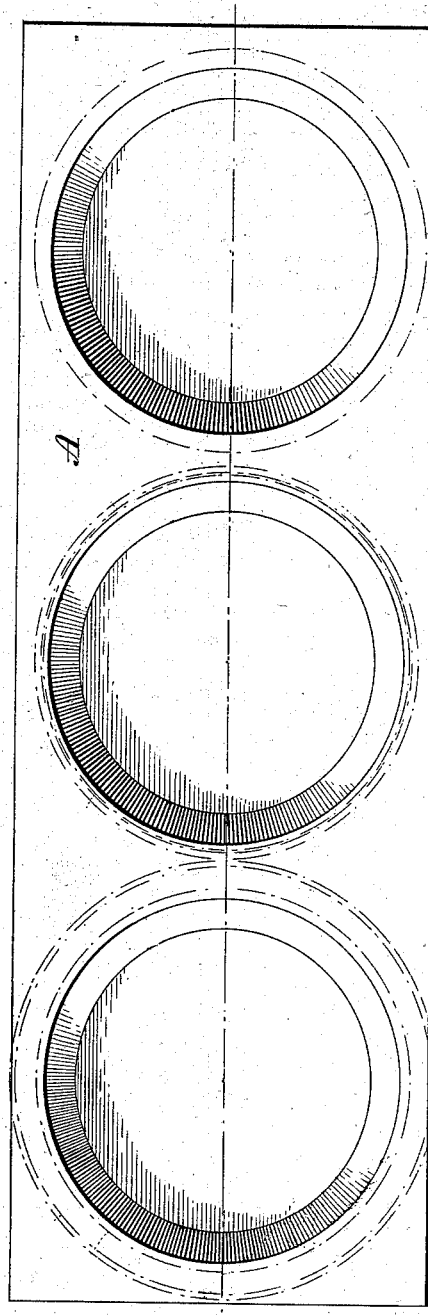
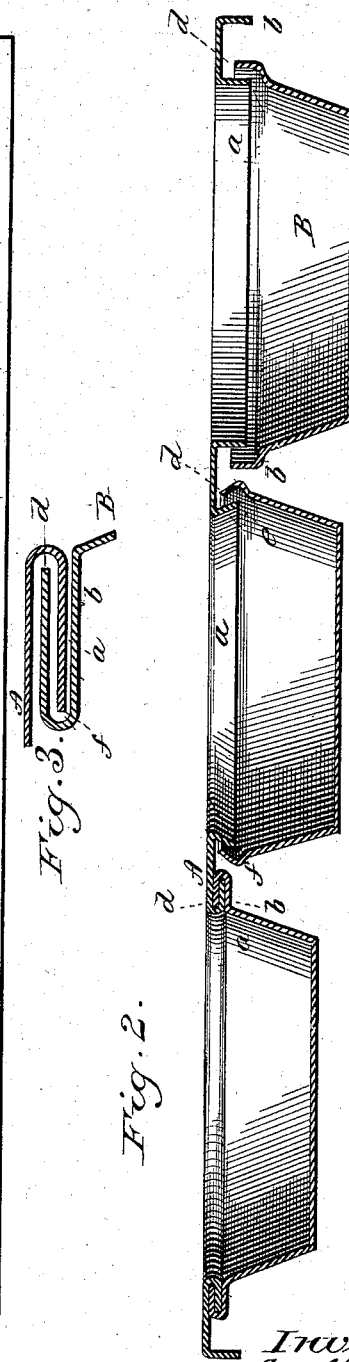
Witnesses:
Inventor:
Joseph Smith

UNITED STATES PATENT OFFICE.

JOSEPH SMITH, OF PORTLAND, CONNECTICUT, ASSIGNOR TO JOHN E. INGERSOLL, OF SAME PLACE.

PATTY-PAN.

SPECIFICATION forming part of Letters Patent No. 255,045, dated March 14, 1882.

Application filed December 29, 1881. (Model.)

*To all whom it may concern:*

Be it known that I, JOSEPH SMITH, of Portland, in the county of Middlesex and State of Connecticut, have invented new Improvements in the Manufacture of Patty-Pans; and I do hereby declare the following, when taken in connection with accompanying drawings and the letters of reference marked thereon, to be a full, clear, and exact description of the same, and which said drawings constitute part of this specification, and represent, in—

Figure 1, a top or plan view; Fig. 2, longitudinal central section, illustrating the method of construction; Fig. 3, enlarged view to illustrate the joint.

This invention relates to an improvement in the article for culinary uses commonly called "patty-pans," and particularly to that class in which several patty-pans are combined in a single plate.

Various devices have been employed to unite the pans with the plate—such, for instance, as described in Patent No. 140,619, in which the plate has holes cut in it corresponding to the position of the pan and of little less diameter than the largest diameter of the pan, the edge around the hole turned up to form a vertical flange, the pan having its upper edge turned over and downward outside, so as to pass through the hole in the plate until the flange on the upper surface of the plate passes under the turned-over edge of the pan; then the pan is struck down upon the plate, turning the flange over outward and interlocking with the edge of the pan; but this construction forms a rim on the top of the plate around each pan, which obstructs the surface of the plate, and also makes it difficult to properly clean the plate. Or in Patent No. 156,509, in which a bead is formed upon the side of the pan a little below its edge, and upon which the plate will rest; then the edge of the pan is turned over and struck down onto the plate; but to this there is the same objection as in the first-mentioned construction.

The object of this invention is to overcome these objections and unite patty-pans to the plate so as to present a flush even surface on the top and it consists in the construction, as hereinafter described, and more particularly recited in the claim.

A represents the plate, through which openings are cut according to the number of pans required to be attached, and in diameter less than the diameter of the top of the pan. The edge of the opening is turned downward to form a downwardly-projecting flange, $a$, as seen at the right in Fig. 2.

The pan B is struck up from a disk of metal in the usual manner, but so as to expand at the top and form a shoulder, $b$, a little below the upper edge, as seen at the right in Fig. 2, and so that the internal diameter at that point is considerably larger than the external diameter of the downwardly-projecting flange, as there shown. Then the pan is placed onto the plate over the flange, and by suitable dies or other devices the edge $d$ of the pan is turned inward and the edge $e$ of the flange is turned outward beneath the edge of the pan, as seen at the center, Fig. 2, and this operation is continued until the edge of the pan and the shoulder $b$ close upon the turned-down edge or flange $a$ close upon the under side of the plate, as seen at the left, Fig. 2, thus uniting the pans to the plate in the most perfect manner, leaving the upper surface of the plate flat and smooth, the joint being made entirely upon the under side of the plate.

From the foregoing it will be understood that I do not broadly claim uniting patty-pans to the plate by a lapped or folded joint; but What I do claim is—

The herein-described improvement in the manufacture of patty-pans, consisting in the plate A, constructed with the flange $a$ turned downward around the pan-opening, the pan, constructed with the shoulder $b$ near its upper edge to set on over the downwardly-projecting flange of the plate, and then the edge of the pan and the flange struck together, to close the flange between the edge of the plate and the shoulder and secure the parts to the under side of the plate, substantially as described.

JOSEPH SMITH.

Witnesses:
BENJ. L. WATSON,
D. A. MCQUILLIN.